US010817295B2

(12) United States Patent
Giroux et al.

(10) Patent No.: US 10,817,295 B2
(45) Date of Patent: Oct. 27, 2020

(54) THREAD-LEVEL SLEEP IN A MULTITHREADED ARCHITECTURE

(71) Applicant: NVIDIA CORPORATION, Santa Clara, CA (US)

(72) Inventors: Olivier Giroux, Santa Clara, CA (US); Peter Nelson, San Francisco, CA (US); Jack Choquette, Palo Alto, CA (US); Ajay Sudarshan Tirumala, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 36 days.

(21) Appl. No.: 15/582,549

(22) Filed: Apr. 28, 2017

(65) Prior Publication Data
US 2018/0314522 A1 Nov. 1, 2018

(51) Int. Cl.
G06F 9/30 (2018.01)
G06F 9/38 (2018.01)
G06F 9/46 (2006.01)

(52) U.S. Cl.
CPC .......... G06F 9/3009 (2013.01); G06F 9/3851 (2013.01); G06F 9/46 (2013.01)

(58) Field of Classification Search
CPC .................................................. G06F 9/3009
See application file for complete search history.

(56) References Cited

U.S. PATENT DOCUMENTS

| H1414 H | * | 2/1995 | Borgen ................... 711/103 |
| 6,295,238 B1 | * | 9/2001 | Tanizaki ............ G11C 11/406 365/201 |
| 7,530,055 B1 | * | 5/2009 | Leventhal .......... G06F 11/3644 717/128 |
| 8,954,968 B1 | * | 2/2015 | Pohl .................... G06F 11/3409 718/100 |
| 2005/0153751 A1 | * | 7/2005 | Bultan ............... H04W 52/0248 455/574 |
| 2007/0105525 A1 | * | 5/2007 | Wang ................. H04W 52/029 455/343.1 |
| 2010/0095306 A1 | * | 4/2010 | Gomyo .............. G06F 9/30083 718/107 |
| 2011/0185214 A1 | * | 7/2011 | Luskind .................. G06F 1/12 713/375 |

* cited by examiner

Primary Examiner — Aimee Li
Assistant Examiner — William V Nguyen
(74) Attorney, Agent, or Firm — Artegis Law Group, LLP

(57) ABSTRACT

A streaming multiprocessor (SM) includes a nanosleep (NS) unit configured to cause individual threads executing on the SM to sleep for a programmer-specified interval of time. For a given thread, the NS unit parses a NANOSLEEP instruction and extracts a sleep time. The NS unit then maps the sleep time to a single bit of a timer and causes the thread to sleep. When the timer bit changes, the sleep time expires, and the NS unit awakens the thread. The thread may then continue executing. The SM also includes a nanotrap (NT) unit configured to issue traps using a similar timing mechanism to that described above. For a given thread, the NT unit parses a NANOTRAP instruction and extracts a trap time. The NT unit then maps the trap time to a single bit of a timer. When the timer bit changes, the NT unit issues a trap.

21 Claims, 9 Drawing Sheets

THREAD-LEVEL SLEEP IN A MULTITHREADED ARCHITECTURE

BACKGROUND OF THE INVENTION

Field of the Invention

Embodiments of the present invention relate generally to multithreaded processing and, more specifically, to thread-level sleep in a mutlithreaded architecture.

Description of the Related Art

In a conventional single-threaded processing architecture, a central processing unit (CPU) executes individual threads associated with an operating system (OS) or with user-level application programs. These conventional single-threaded processing architectures typically provide application programmers with fine-grained control over the execution of each individual thread. Accordingly, having granular level control over each thread has become a well-understood programming paradigm and is now an expectation among application programmers.

In some instances, an application programmer may wish to cause an application-level thread to "sleep" for a period of time. When a thread sleeps, the thread temporarily relinquishes control over the processing resources of the CPU until the sleep period expires. To implement this functionality, the application programmer could, for example, cause the OS to poll a counter that specifies how long the thread should sleep. When the counter reaches a certain value, the OS would reactivate the thread, and the thread would continue executing. The ability to cause an individual thread to sleep falls within the paradigm of granular thread control discussed above.

One drawback of current multithreaded architectures is that these architectures do not allow the same level of granular control over the execution of individual threads that single-threaded architectures allow. One consequence of this lack of granular thread control is that conventional multi-threaded architectures do not allow programmers to configure individual threads to sleep in the manner described above. Another consequence is that application programmers cannot utilize conventional programming paradigms when developing multithreaded applications.

As the foregoing illustrates, what is needed in the art are improved techniques for programming multithreaded applications.

SUMMARY OF THE PRESENT INVENTION

One embodiment of the present invention sets forth a computer-implemented method for causing an executing thread to sleep, including parsing a first sleep instruction to extract a first sleep time, where the first sleep instruction is associated with a first thread that is executing on a parallel processor, mapping the first sleep time to a bit of a timer, causing the first thread to pause execution, detecting a change in the bit, and causing the first thread to resume execution.

At least one advantage of the techniques described above is that application programmers familiar with single-threaded architectures may apply programming paradigms associated with those architectures to traditional multi-threaded programming, including, for example, OpenMP, to use those programming paradigms towards programming multi-threaded processors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
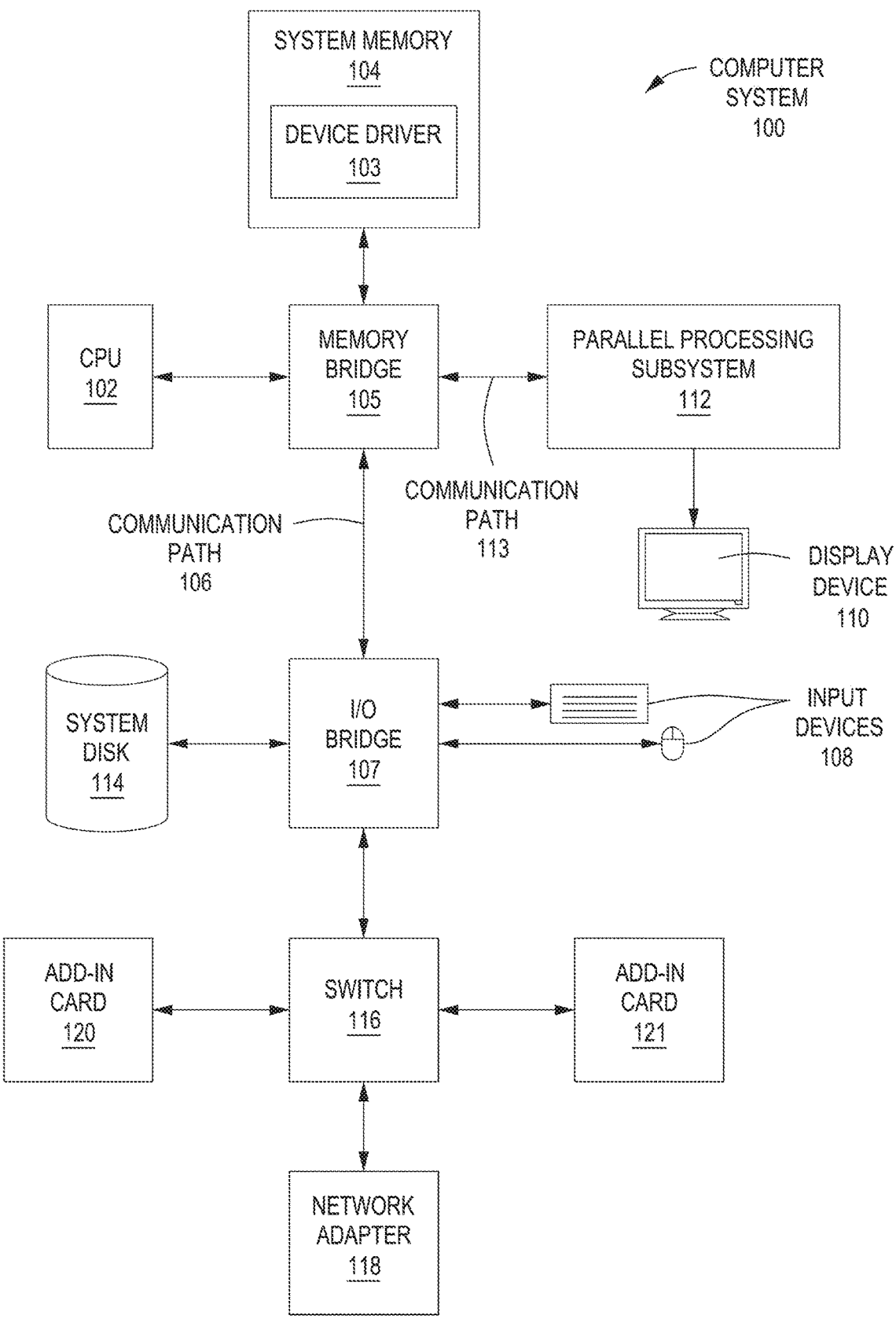
FIG. 1 is a block diagram of a computer system configured to implement one or more aspects of the present invention.

FIG. 1 is a block diagram of a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
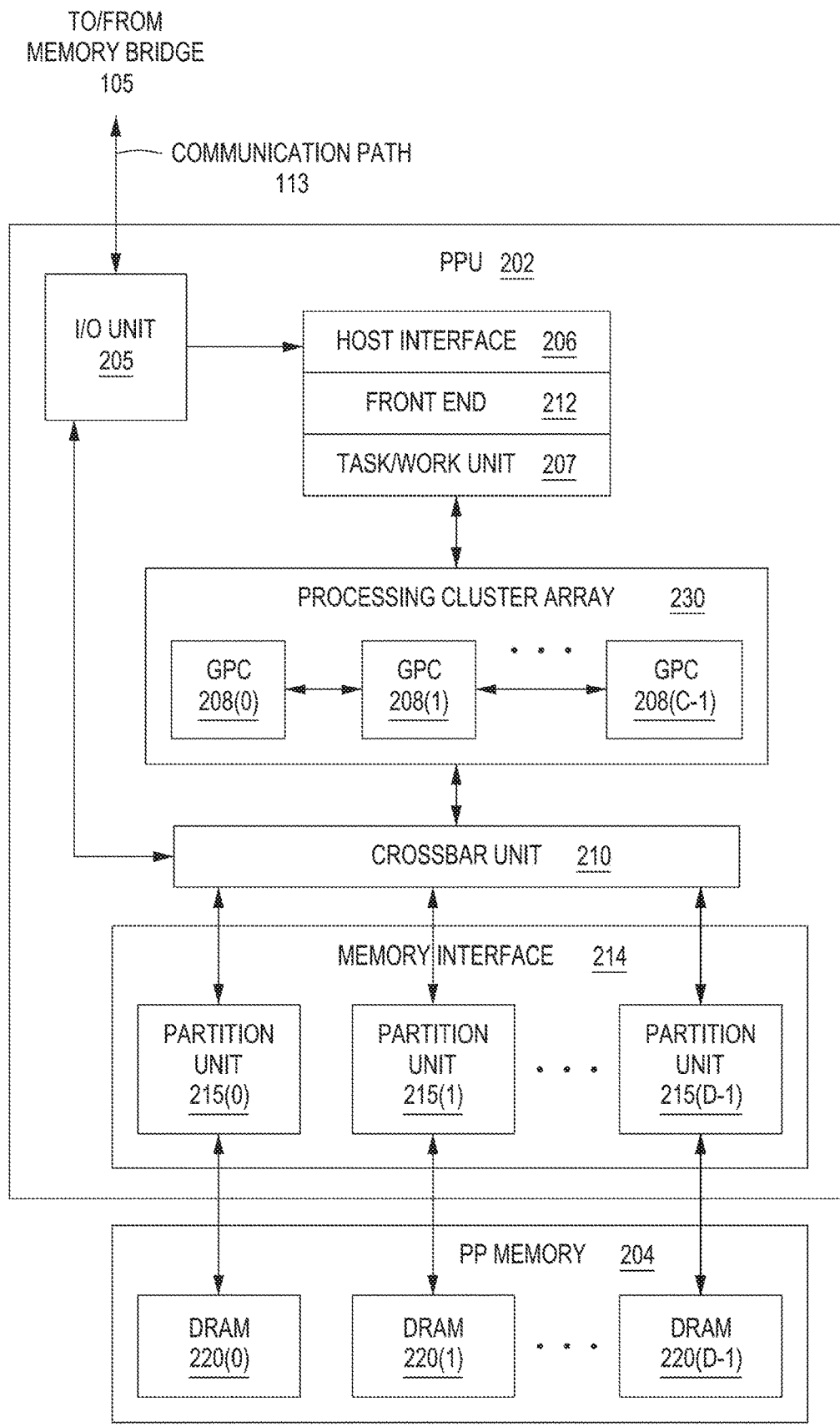
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C ☐ 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D ☐ 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
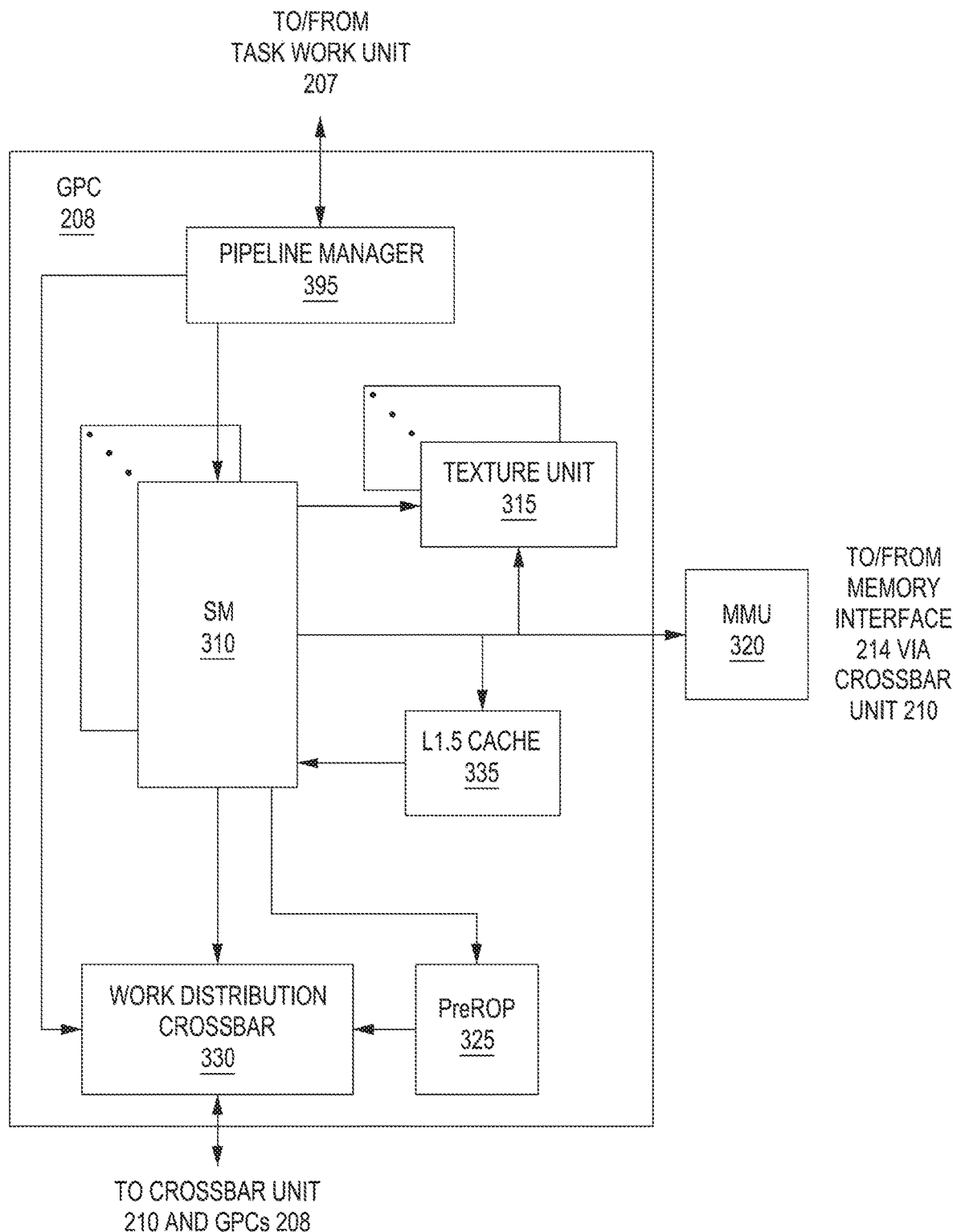
FIG. 3A is a block diagram of a general processing cluster included in the parallel processing unit of FIG. 2, according to various embodiments of the present invention.

FIG. 3A is a block diagram of a GPC 208 included in PPU 202 of FIG. 2, according to various embodiments of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Figure 3B:
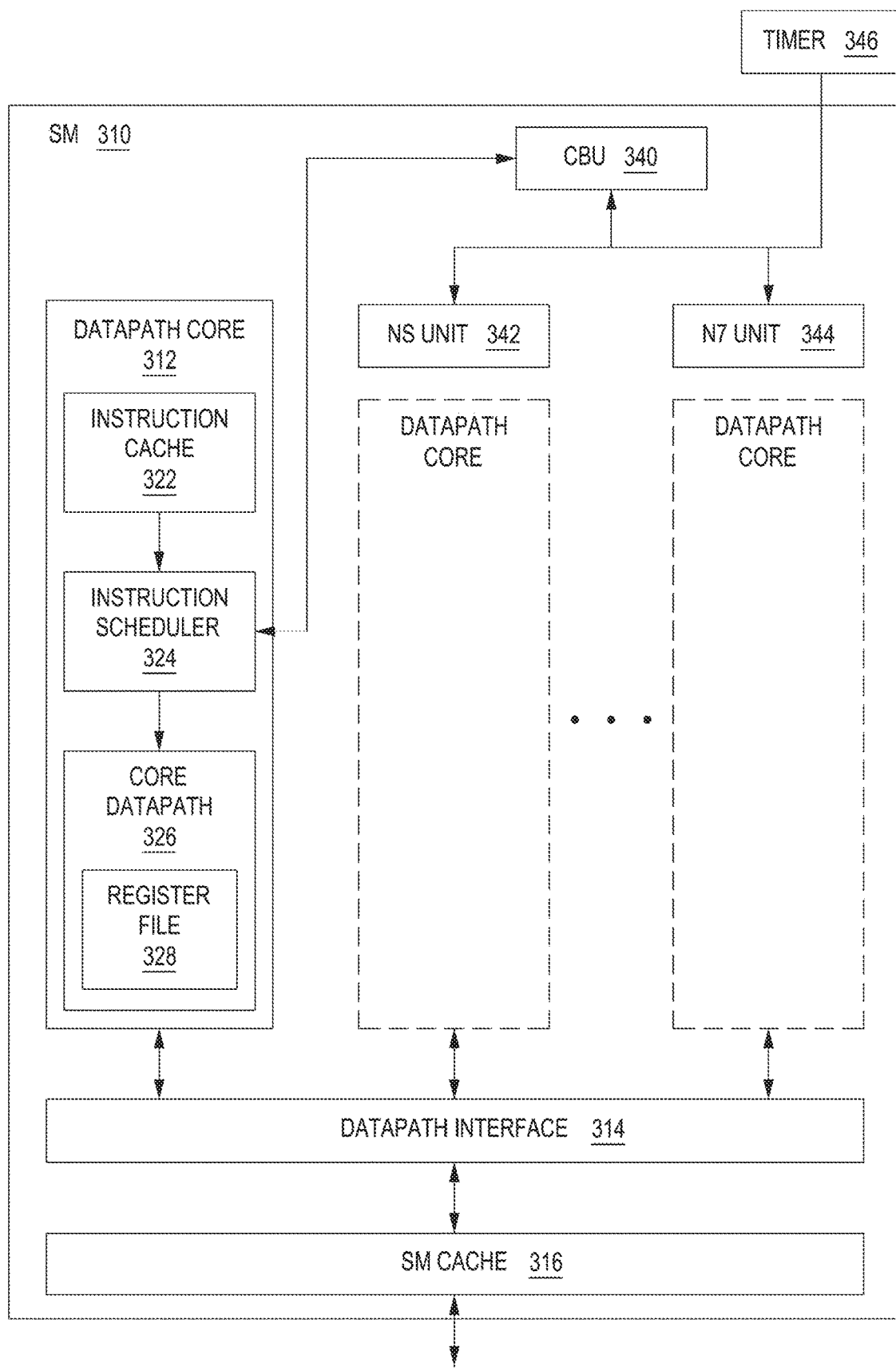
FIG. 3B is a more detailed illustration of the streaming multiprocessor (SM) of FIG. 3A, according to various embodiments of the present invention.

FIG. 3B is a more detailed illustration of the streaming multiprocessor (SM) of FIG. 3A, according to various embodiments of the present invention. As shown, SM 310 includes one or more datapath cores 312 coupled to a datapath interface 314 that, in turn, is coupled to an SM cache 316. SM cache 316 could be, for example, L1.5 cache 335 of FIG. 3A.

Each data path core 312 is configured to execute instructions associated with threads included in a thread group or warp. A given datapath core 312 includes an instruction cache 322, an instruction scheduler 324, and a core datapath 326 that includes a register file 328. Instruction cache 322 caches instructions to be executed for threads in one or more thread groups. Instruction scheduler 324 schedules cached instructions for execution. Core datapath 326 includes various units configured to execute instructions, including execution units, load/store units, and so forth. Register file 328 is configured to store data processed within core datapath 326.

As also show, SM 310 includes a convergence barrier unit (CBU) 340 coupled to a nanosleep (NS) unit 342 and a nanotrap (NT) unit 344. NS unit 342 and NT unit 344 are coupled to a timer 346. Timer 346 is a nanosecond timer, meaning that each increment of timer 346 corresponds to a number of elapsed nanoseconds. CBU 340 is a hardware unit that, in response to application-level instructions, manages divergent and convergent thread behavior associated with threads executing instructions on datapath core 312. A canonical example of how CBU 340 manages such behavior is discussed in greater detail below in conjunction with FIG. 4.

Figure 4:
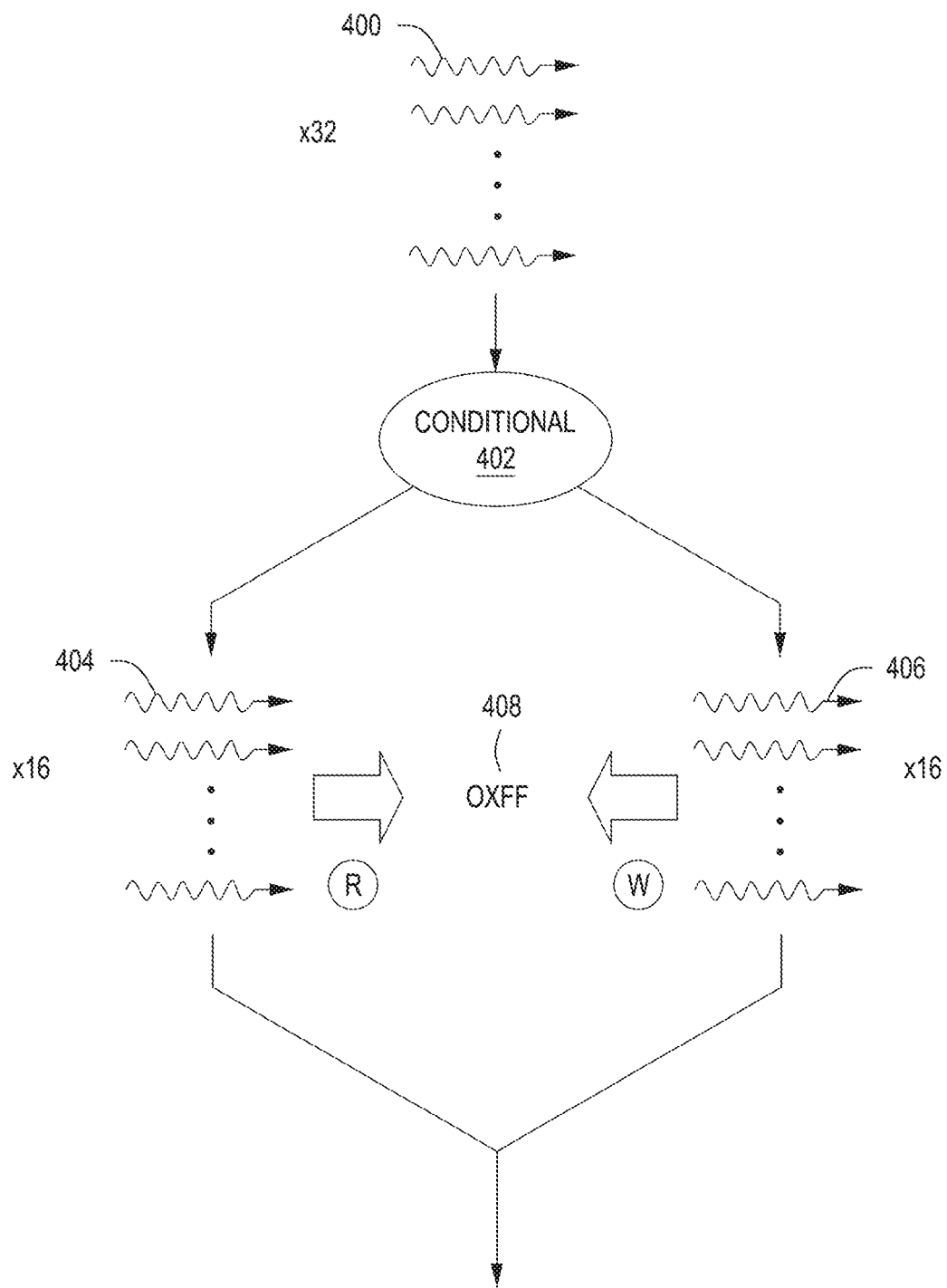
FIG. 4 is a conceptual diagram of a set of threads executing a conditional instruction, according to various embodiments of the present invention.

FIG. 4 is a conceptual diagram of a set of threads executing a conditional instruction, according to various embodiments of the present invention. As shown, a set 400 of threads includes 32 threads. Set 400 may execute on datapath core 312 shown in FIG. 3B. Each thread in set 400 is configured to execute a conditional statement shown as conditional 402. Conditional 402 could be an if/else statement, for example. Upon execution of conditional 402, set 400 diverges and a subset 404 of threads follows one execution branch and a subset 406 of threads follows another execution branch. Subsets 404 and 406 then execute separate portions of code in parallel with one another. For example, subset 404 could execute code associated with an "if" portion of conditional 402, while subset 406 could execute code associated with an "else" portion of conditional 402.

In conventional parallel processing environments, two subsets of threads executing on separate branches cannot safely access the same data. For example, suppose one subset attempts to read data stored at a given location, while simultaneously another subset of threads attempts to write data to that same location. The first subset could potentially read old or invalid data, depending on when the first subset reads the data from the location. The two subsets of threads could also become deadlocked, thereby preventing both subsets from making forward progress.

However, subsets of threads executing on SM 310 are not vulnerable to problems such as those described above. Thus, without causing conflicts, subset 404 may execute instructions to read data from a location 408 while subset 406 executes instructions to write data to location 408. To achieve this functionality, CBU 340 manages the execution of subsets 404 and 406 to prevent subset 404 from reading data from location 408 until after subset 406 has written data to that location. In one embodiment, CBU 340 processes a YIELD instruction to stop subset 404 reading from location 408 until subset 406 has finished writing to location 408. Once each of subsets 404 and 406 has completed executing along the respective conditional branches described above, CBU 340 may then cause the different subsets to converge and continue executing in a more synchronized manner.

CBU 340 is also configured to interact with NS unit 342 and NT unit 344 to cause sets and subsets of threads to perform specific actions at certain times based on timer 346. In particular, NS unit 342 may cause sets and subsets of threads to sleep for an interval of time configured by an application programmer, as described below in conjunction with FIGS. 5-6. NT unit 344 may trap sets and subsets of threads after a programmer-configured interval of time has elapsed, as described in greater detail below in conjunction with FIGS. 7-8.

Thread-Level Sleep Control

Figure 5:
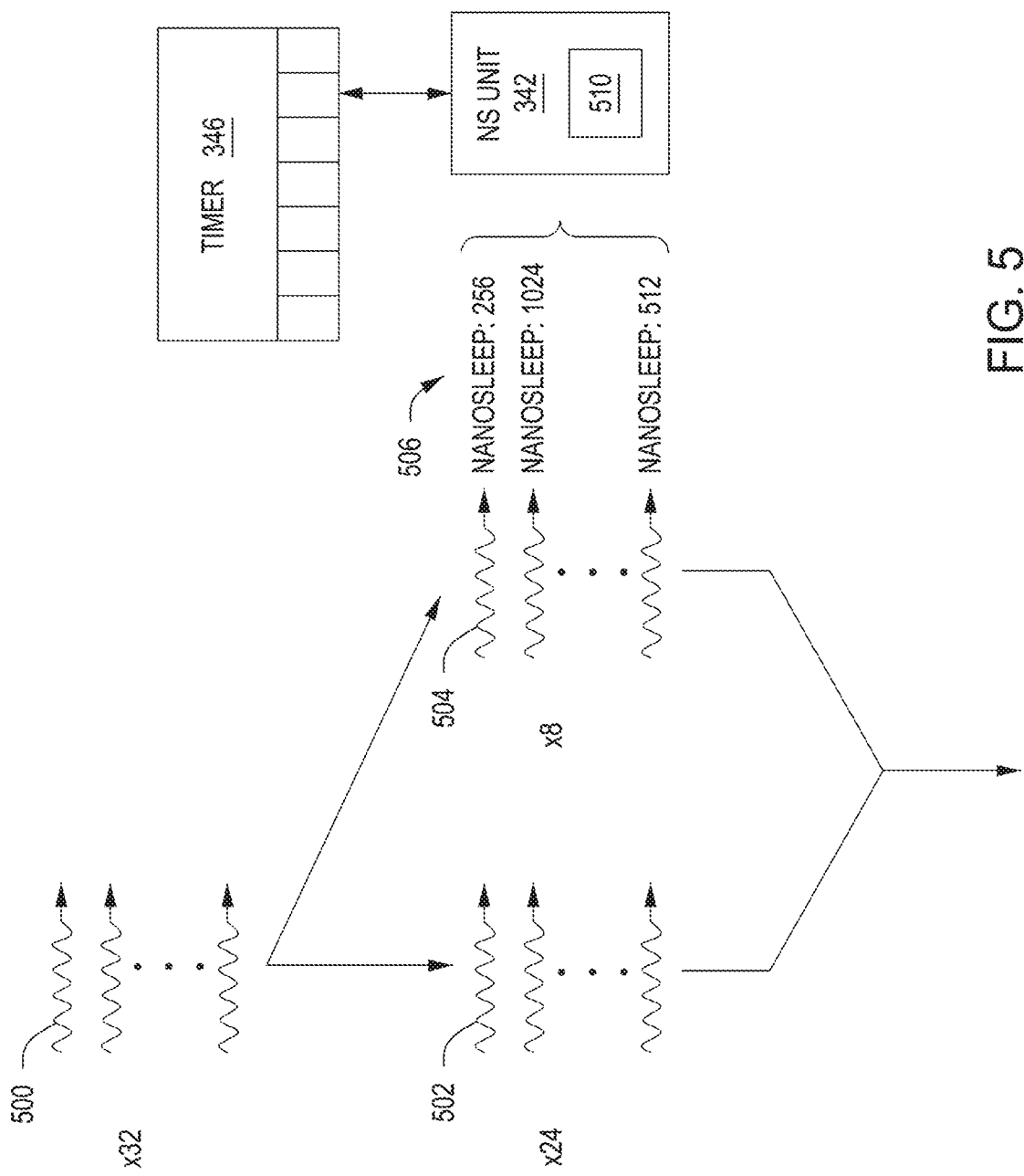
FIG. 5 is a conceptual diagram of a subset of threads issuing NANOSLEEP instructions, according to various embodiments of the present invention.

FIG. 5 is a conceptual diagram of a subset of threads issuing NANOSLEEP instructions, according to various embodiments of the present invention. As shown, a set 500 of threads includes a subset 502 of threads that do not issue NANOSLEEP instructions and subset 504 of threads that issue NANOSLEEP instructions 506. NS unit 342 is configured to manage the execution of NANOSLEEP instructions 506 on behalf of threads in subset 504 to cause those threads to sleep.

Each issued NANOSLEEP instruction 506 includes a sleep time that is defined by the application programmer when writing an application that executes on PPU 202. As shown, subset 504 issues NANOSLEEP instructions 506 with sleep times 256, 1024, and 512. The sleep time associated with a given NANOSLEEP instruction 506 represents a number of nanoseconds that the issuing thread should sleep when the NANOSLEEP instruction is executed. Each sleep time is a power of two, so the sleep times shown may also be expressed as $2^8$, $2^{10}$, and $2^9$, respectively. The application programmer may program sleep times to be non-power of two values, although in practice power of two values may be easier for NS unit 342 to handle. NS unit 342 causes each thread in subset 504 to sleep for a particular sleep time based on timer 346.

As mentioned above in conjunction with FIG. 3B, timer 346 is a nanosecond timer, meaning that each increment of timer 346 corresponds to a number of elapsed nanoseconds. Those familiar with hardware timers will understand that each bit of timer 346 corresponds to a different power of two. For example, bit 0 of timer 346 corresponds to $2^0$ nanoseconds, bit 6 of timer 346 corresponds to $2^6$ nanoseconds, and bit N of timer corresponds to $2^N$ nanoseconds. NS unit 342 is configured to monitor individual bits of timer 346 to estimate when a maximum of any power-of-two number of nanoseconds has elapsed. For example, to determine that at most 128 ($2^7$) nanoseconds have elapsed, NS unit 342 would monitor the 7th bit of timer 346. To determine that at most 512 ($2^9$) nanoseconds have elapsed, NS unit 342 would monitor the 9th bit of timer 346, and to determine that at most $2^N$ nanoseconds have elapsed, NS unit 342 would monitor the Nth bit of timer 346.

Based on the above principles, NS unit 342 may cause any given thread or subset of threads to sleep for (at most) the sleep time indicated in a NANOSLEEP instruction 506 by monitoring a bit of timer 346 corresponding to the sleep time associated with that NANOSLEEP instruction. For example, suppose a thread in subset 504 issues a NANOSLEEP instruction 506 having a sleep time of 2048 nanoseconds. NS unit 342 would cause the thread to sleep and then monitor the 11th bit of timer 346. When the 11th bit of timer 346 changes, at most 2048 nanoseconds have elapsed, and NS unit 342 then awakens the thread. The exact amount of time that a given thread sleeps is dependent on the previous state of timer 346. However, monitoring individual bits of timer 346 in the manner described allows NS unit 342 to establish an upper bound to the amount of time elapsed.

NS unit 342 may be configured to cause threads in subset 504 to sleep on a per-thread basis, as described above. However, in practice, NS unit 342 causes threads in subset 504 to sleep based on the minimum of all sleep times requested by those threads. In doing so, NS unit 542 parses each invocation of NANOSLEEP instruction 506 to extract all sleep times. NS unit 342 then determines the minimum value across all sleep times to produce minimum sleep time 510. In one embodiment, NS unit 342 may also select the greater of minimum sleep time 510 and a minimum allowable sleep time. In the example shown, minimum sleep time 510 has a value of 256 or $2^8$. NS unit 342 then maps minimum sleep time 510 to the 8th bit of timer 346 and causes each thread in subset 506 to sleep. When the 8th bit of timer 346 changes, NS unit 342 awakens each thread in subset 504.

Although NS unit 342 may be configured to cause each thread to sleep independently, as mentioned, one of the advantages of causing all threads in subset 504 to sleep based on minimum sleep time 510 is that doing so conserves both area and power in NS unit 542. One consideration associated with causing all threads in subset 504 to sleep for minimum sleep time 510 is that some threads may awaken early. However, a well-known programming paradigm indicates that when a thread is awakened before that thread is ready to continue executing, the thread should then sleep for double the original sleep time. Because NS unit 342 coordinates thread sleeping based on power of two sleep times, NS unit 342 operates in a manner that supports this programming paradigm.

When the threads in subset 504 have finished sleeping, meaning that NS unit 342 has determined that the appropriate bit(s) of timer 346 have changed, CBU 340 may then coordinate convergence of subsets 502 and 504. Following convergence, set 500 of threads may continue execution. In one embodiment, all threads in set 500 may issue NANOSLEEP instruction 506. In such situations, NS unit 542 prevents set 500 from issuing any other instructions until the associated threads awaken, thereby freeing system resources while those threads sleep. The techniques described above are also described in stepwise fashion below in conjunction with FIG. 6.

Figure 6:
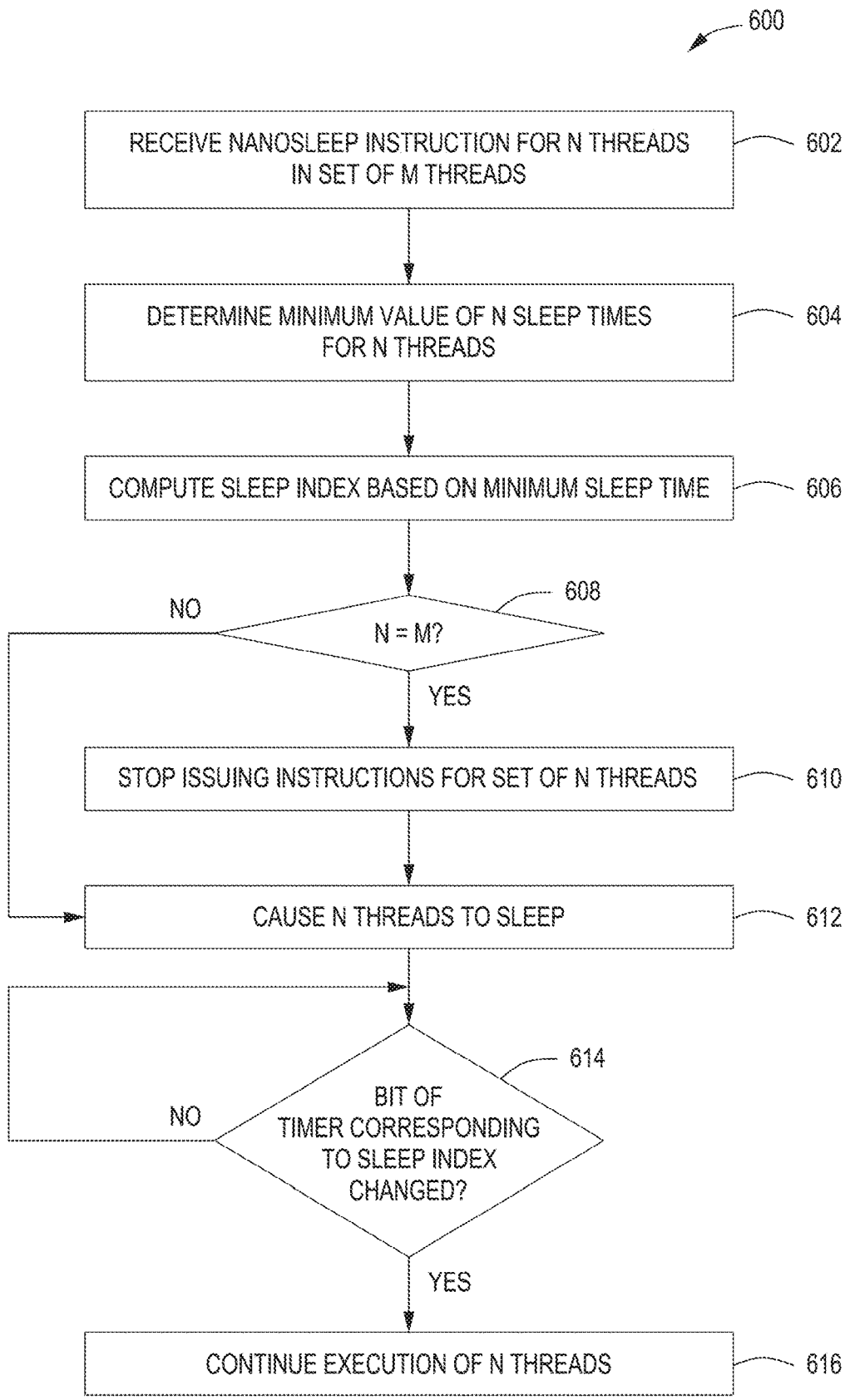
FIG. 6 is a flow diagram of method steps for causing a thread executing on a parallel processor to sleep for an interval of time, according to various embodiments of the present invention.

FIG. 6 is a flow diagram of method steps for causing a thread executing on a parallel processor to sleep for an interval of time, according to various embodiments of the present invention. Although the method steps are described in conjunction with the system of FIGS. 1-5, persons skilled in the art will understand that any system configured to perform the method steps, in any order, falls within the scope of the present invention.

As shown, a method 602 begins at step 602, where NS unit 542 receives a NANOSLEEP instruction for N threads in a set of M threads. The N threads could be, for example, subset 504 of threads discussed above in conjunction with FIG. 5. At step 604, NS unit 542 determines the minimum sleep time across the N threads. The minimum sleep time is generally a power of two number of nanoseconds. At step 606, NS unit 542 determines an index of timer 546 that is associated with a bit corresponding to the minimum sleep time. For example, if the minimum sleep time is 64 nanoseconds, or $2^6$, then NS unit 542 would identify the 6th bit of timer 346.

At step 608, NS unit 342 determines whether N=M. In other words, NS unit 342 determines whether all threads in the set of M threads should sleep, or only a subset of those threads. If N=M, the method 600 proceeds to steep 610 and NS unit 342 stops those M threads from issuing additional instructions. Otherwise, the method skips step 610 and proceeds to step 612.

At step 612, NS unit 342 causes the N threads to sleep. NS unit 342 then performs step 614 repeatedly until the bit of timer 346 associated with the sleep index determined at step 606 changes. When that bit changes, NS unit 542 proceeds to step 616, where NS unit 342 awakens the N threads and allows those threads to continue execution.

With SM 310 configured to perform the techniques described above, application programmers may program applications to execute on PPU 202 using familiar programming paradigms. In particular, an application programmer can cause individual threads to sleep for configurable intervals of time using the NANOSLEEP instruction. In response to the NANOSLEEP instruction, NS unit 342 implements thread-level sleep control. The timing principles discussed above may also be implemented to issue traps, as discussed in greater detail below in conjunction with FIGS. 7-8.

Thread-Level Trap Control

Figure 7:
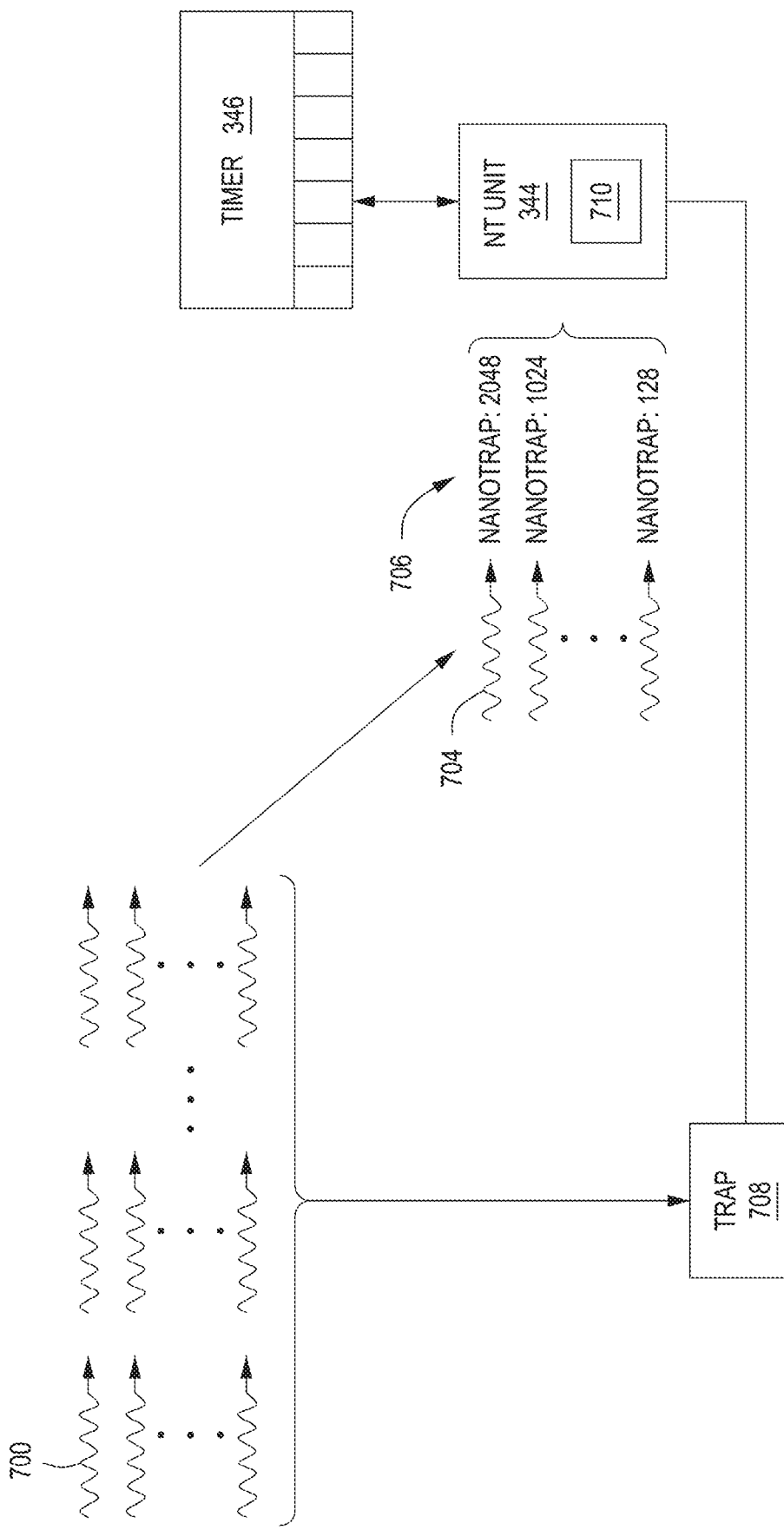
FIG. 7 is a conceptual diagram of a subset of threads issuing NANOTRAP instructions, according to various embodiments of the present invention.

FIG. 7 is a conceptual diagram of a subset of threads issuing a NANOTRAP instruction, according to various embodiments of the present invention. As shown, a set of threads 700 includes a subset of threads 702 that issue NANOTRAP instructions 704. Set 700 may include all thread groups currently active on core datapath 312. Each NANOTRAP instruction 704 issued by a thread in subset 702 includes a trap time. A given trap time indicates a number of nanoseconds until a trap should be issued. Similar to sleep times discussed above in conjunction with FIGS. 5-6, an application programmer configures the trap times as power of two values. Trap times 2048, 1024, and 128 are shown, which may also be expressed as $2^{11}$, $2^{10}$, and $2^7$, respectively.

NT unit 344 is configured to process NANOTRAP instructions 704 on behalf of threads in subset 702 using a similar technique to that implemented by NS unit 342. In particular, NT unit 344 is configured to map the trap time associated with a given thread to a particular bit of timer 346. For example, NT unit 344 could map a trap time of 256 ($2^8$) to the 8th bit of timer 346. When that bit changes value, NT unit 344 issues a trap. In one embodiment, NT unit 344 processes trap times for different threads in subset 702 independently, and may thus monitor many bits of timer 346 and then issue traps to each thread separately.

However, in practice NT unit 344 processes all trap times and then generates minimum trap time 706. NT unit 344 maps minimum trap time 706 to a particular bit of timer 346, using the power of two technique described, and then issues a trap 708 when that bit changes value. All threads in set 700 are subject to the trap and may halt execution in response. The technique described above is also described in stepwise fashion below in conjunction with FIG. 8.

Figure 8:
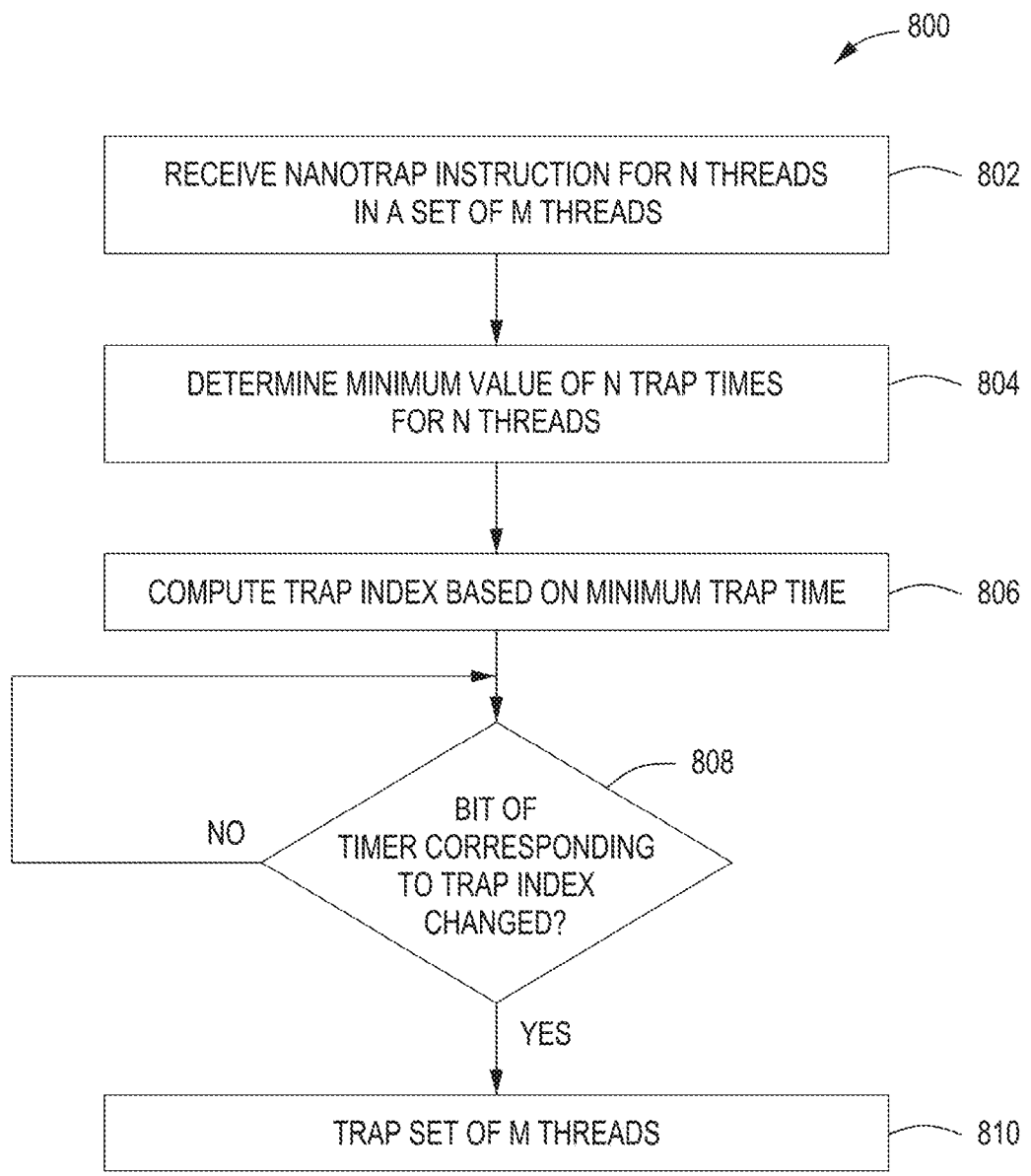
FIG. 8 is a flow diagram of method steps for trapping a thread after an interval of time has elapsed, according to one embodiment of the present invention.

FIG. 8 is a flow diagram of method steps for trapping a thread after an interval of time has elapsed, according to various embodiments of the present invention. Although the method steps are described in conjunction with the system of FIGS. 1-4 and 7, persons skilled in the art will understand that any system configured to perform the method steps, in any order, falls within the scope of the present invention.

As shown, a method 800 begins at step 802, where NT unit 344 receives NANOTRAP instructions 704 for N threads in a set of M threads. The set of M threads could be set 700, for example, while the set of N threads could be subset 702. At step 804, NT unit 344 determines the minimum across all trap times associated with the NANOTRAP instructions received at step 802. At step 806, NT unit computes a trap index based on the minimum trap time. The trap index is a bit location in timer 346 corresponding to the exponent of the power of two representation of the minimum trap time. NT unit 344 then repeats step 808 until the bit off timer 346 corresponding to the determined trap time changes. At step 810, NT unit 344 traps all M threads.

In sum, a streaming multiprocessor (SM) includes a nanosleep (NS) unit configured to cause individual threads executing on the SM to sleep for a programmer-specified interval of time. For a given thread, the NS unit parses a NANOSLEEP instruction and extracts a sleep time. The NS unit then maps the sleep time to a single bit of a timer and causes the thread to sleep. When the timer bit changes, the sleep time expires, and the NS unit awakens the thread. The thread may then continue executing.

The NS unit is further configured to cause one subset of threads to sleep while a second subset of threads continues to execute on the SM. The NS unit parses NANOSLEEP instructions for each thread in the first subset of threads and then determines the minimum sleep time across all sleep times. The NS unit maps this minimum sleep time to a single bit of the timer and then causes the first subset of threads to sleep. The second subset of threads may continue to execute while the first subset of threads sleeps. When the timer bit changes, the NS unit awakens the first subset of threads, and those threads may then rejoin the second subset of threads. In situations where all threads in a given set of threads sleep, the NS unit may prevent that set of threads from issuing any instructions until the entire set of threads is awakened.

The SM also includes a nanotrap (NT) unit configured to issue traps using a similar timing mechanism to that described above. For a given thread, the NT unit parses a NANOTRAP instruction and extracts a trap time. The NT unit then maps the trap time to a single bit of a timer. When the timer bit changes, the trap time expires, and the NT unit issues a trap. Some or all threads executing on the SM may then cease execution in response to the trap.

At least one advantage of the techniques described above is that application programmers familiar with single-threaded architectures may apply programming paradigms associated with those architectures to multi-threaded architectures. More specifically, via the techniques described above, application programmers can program individual threads executing on a parallel processor to sleep for configurable durations of time.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What we claim is:

1. A computer-implemented method, comprising:
    parsing a first sleep instruction associated with a first thread executing on a parallel processor to extract a first sleep time, wherein a value of the first sleep time comprises a first positive value;
    mapping the first sleep time to a first bit of a timer, wherein the first bit is selected based on a value of the first sleep time and is included in a plurality of bits of the timer that increment after each elapse of a first period of time;
    causing the first thread to halt execution;
    monitoring the first bit without monitoring at least one of the other bits included in the plurality of bits;
    detecting a change in the first bit; and
    in response to detecting the change, causing the first thread to resume execution.

2. A computer-implemented method, comprising:
    parsing a first sleep instruction associated with a first thread included in a set of threads executing on a parallel processor to extract a first sleep time, wherein a value of the first sleep time comprises a first positive value;
    parsing a second sleep instruction associated with a second thread included in the set of threads to extract a second sleep time, wherein a value of the second sleep time comprises a second positive value;
    determining a thread sleep time based on the lesser of the first sleep time and the second sleep time;
    mapping the thread sleep time to a first bit of a timer;

causing the first thread and the second thread to halt execution;
detecting a change in the first bit of the timer; and
in response to the change, causing the first thread and the second thread to resume execution.

3. The computer-implemented method of claim 1, wherein the first sleep time corresponds to a value of 2^N, where N is a non-negative integer.

4. The computer-implemented method of claim 3, wherein mapping the first sleep time to the first bit of the timer comprises identifying an Nth bit of the timer based on the value of 2^N.

5. The computer-implemented method of claim 1, wherein the first thread is included in a first set of threads that is executing on the parallel processor, and the first set of threads also includes a second thread that continues executing on the parallel processor when the first thread halts execution.

6. The computer-implemented method of claim 5, further comprising causing the first thread and the second thread to synchronize execution after the first thread resumes execution.

7. The computer-implemented method of claim 1, further comprising:
parsing a second sleep instruction to extract a second sleep time, wherein the second sleep instruction is associated with a second thread that also is executing on the parallel processor, and wherein a value of the second sleep time comprises a second positive value;
determining that the first sleep time is less than the second sleep time;
causing the second thread to pause execution in conjunction with the first thread pausing execution; and
causing the second thread to resume execution in conjunction with the first thread resuming execution.

8. The computer-implemented method of claim 1, wherein at least one bit of the timer increments for each nanosecond of time.

9. The computer-implemented method of claim 1, wherein the first sleep time comprises a programmable value included within an application program written to execute on the parallel processor.

10. One or more non-transitory computer-readable media that include instructions that, when executed by one or more processors, cause the one or more processors to perform the steps of:
parsing a first sleep instruction to extract a first sleep time, wherein the first sleep instruction is associated with a first thread that is executing on a parallel processor, and wherein a value of the first sleep time comprises a first positive value;
mapping the first sleep time to a first bit of a timer, wherein the first bit is selected based on a value of the first sleep time and is included in a plurality of bits of the timer that increment after each elapse of a first period of time;
causing the first thread to pause execution;
monitoring the first bit without monitoring at least one of the other bits included in the plurality of bits;
detecting a change in the first bit; and
in response to detecting the change, causing the first thread to resume execution.

11. The one or more non-transitory computer-readable media of claim 10, wherein the first sleep time is a power of two value.

12. The one or more non-transitory computer-readable media of claim 11, wherein the step of mapping the first sleep time to the first bit of the timer comprises identifying a bit of the timer corresponding to an exponent associated with the power of two value.

13. The one or more non-transitory computer-readable media of claim 10, wherein the first thread is included in a first set of threads that is executing on the parallel processor, and the first set of threads also includes a second thread that continues executing on the parallel processor when the first thread pauses execution.

14. The one or more non-transitory computer-readable media of claim 13, further comprising the step of causing the first thread and the second thread to synchronize execution after the first thread resumes execution.

15. The one or more non-transitory computer-readable media of claim 10, further comprising the step of:
parsing a second sleep instruction to extract a second sleep time, wherein the second sleep instruction is associated with a second thread that also is executing on the parallel processor, and wherein a value of the second sleep time comprises a second positive value;
determining that the first sleep time is less than the second sleep time;
causing the second thread to pause execution in conjunction with the first thread pausing execution; and
causing the second thread to resume execution in conjunction with the first thread resuming execution.

16. The one or more non-transitory computer-readable media of claim 10, wherein at least one bit of the timer increments for each nanosecond of time.

17. The one or more non-transitory computer-readable media of claim 10, wherein the first sleep time comprises a programmable value included within an application program written to execute on the parallel processor.

18. A system, comprising:
a memory storing an application program; and
a processor that, when executing the application program, is configured to:
parse a first instruction to extract a first sleep time, wherein the first instruction is associated with a first thread that is executing on a parallel processor, and wherein a value of the first sleep time comprises a first positive value,
map the first time to a first bit of a timer, wherein the first bit is selected based on a value of the first sleep time and is included in a plurality of bits of the timer that increment after each elapse of a first period of time,
monitoring the first bit without monitoring at least one of the other bits included in the plurality of bits;
detect a change in the first bit, and
in response to detecting the change, initiate a first action on behalf of the thread based on the first instruction and based on the change in the first bit.

19. The system of claim 18, wherein the processor includes a sleep processor configured to:
cause the first thread to pause execution based on the first instruction; and
initiate the first action by causing the first thread to resume execution.

20. The system of claim 18, wherein the processor includes a trap processor configured to initiate the first action by issuing a trap that causes the first thread to halt execution.

21. The one or more non-transitory computer-readable media of claim 10, wherein monitoring the first bit comprises monitoring only the first bit without monitoring any of the other bits included in the plurality of bits.

* * * * *